United States Patent
Carrigan

(10) Patent No.: US 11,867,895 B2
(45) Date of Patent: Jan. 9, 2024

(54) SPACE OPTICAL SYSTEM WITH INTEGRATED SENSOR MOUNTS

(71) Applicant: Raytheon Company, Waltham, MA (US)

(72) Inventor: Keith Carrigan, Marina Del Rey, CA (US)

(73) Assignee: Raytheon Company, Tewksbury, MA (US)

( * ) Notice: Subject to any disclaimer, the term of this patent is extended or adjusted under 35 U.S.C. 154(b) by 693 days.

(21) Appl. No.: 16/420,095

(22) Filed: May 22, 2019

(65) Prior Publication Data

US 2020/0371340 A1    Nov. 26, 2020

(51) Int. Cl.
*G02B 23/16*    (2006.01)
*G02B 7/182*    (2021.01)
*B64G 1/10*    (2006.01)

(52) U.S. Cl.
CPC ............. *G02B 23/16* (2013.01); *G02B 7/182* (2013.01); *B64G 1/1028* (2023.08)

(58) Field of Classification Search
CPC ........ G02B 23/16; G02B 7/182; G02B 7/181; B64G 2001/1028; B64G 1/1021; B64G 1/36; B64G 1/50; B64G 1/66; B64G 1/361; G01C 21/025
USPC ........................................................ 359/399
See application file for complete search history.

(56) References Cited

U.S. PATENT DOCUMENTS

| | | | |
|---|---|---|---|
| 4,051,499 A | 9/1977 | Kondo | |
| 4,286,581 A * | 9/1981 | Atkinson, Jr. | ........ F24S 23/30 126/714 |
| 5,282,016 A * | 1/1994 | Shen | ................. G01B 11/272 250/208.6 |
| 6,072,572 A | 6/2000 | Hatfield et al. | |
| 6,075,597 A | 6/2000 | Olshausen | |
| 7,797,939 B2 * | 9/2010 | Green | ................... F24S 23/79 60/641.14 |
| 7,948,677 B2 | 5/2011 | Voigt et al. | |
| 2005/0046979 A1 * | 3/2005 | Hiley | .................. G02B 7/182 359/877 |

(Continued)

FOREIGN PATENT DOCUMENTS

CN    106114912 A  * 11/2016
EP    2508929 A2  * 10/2012   ........... G02B 7/1815

OTHER PUBLICATIONS

Anonymous, SENTINEL-2, ESA's Optical High-Resolution Mission for GMES Operational Services, https://sentinel.esa.int/documents/247904/349490/s2_sp-1322_2.pdf, Mar. 2, 2012, 80 pages, ESA Communications, Netherlands.

(Continued)

*Primary Examiner* — Wyatt A Stoffa
*Assistant Examiner* — Rahman Abdur

(57) ABSTRACT

A space optical system is disclosed. The space optical system can include a primary support structure in support of a primary mirror. The space optical system can also include a sensor mounting structure coupled to the primary support structure and extending to an exterior of space optical system. The space optical system can further include first and second sensors mounted on the sensor mounting structure. In one aspect, the sensor mounting structure can comprise a thermally and mechanically stable, non-zero CTE material.

21 Claims, 5 Drawing Sheets

(56) References Cited

U.S. PATENT DOCUMENTS

| | | | | |
|---|---|---|---|---|
| 2010/0316437 | A1* | 12/2010 | Newswander | G02B 7/181 403/30 |
| 2012/0257275 | A1* | 10/2012 | Hull | G02B 23/16 359/399 |
| 2012/0321292 | A1 | 12/2012 | Viglione et al. | |
| 2017/0090178 | A1* | 3/2017 | Bullard | G02B 23/06 |
| 2017/0339321 | A1 | 11/2017 | Leonelli, Jr. | |
| 2017/0371139 | A1 | 12/2017 | Ueda | |
| 2018/0027168 | A1 | 1/2018 | Sugita | |
| 2018/0210166 | A1* | 7/2018 | Cannon | G02B 23/16 |
| 2018/0316862 | A1* | 11/2018 | Miller | G01P 13/00 |

OTHER PUBLICATIONS

Guanter et al., The EnMAP Spaceborne Imaging Spectroscopy Missino for Earth Observation, Jul. 13, 2015, pp. 8830-8857, vol. 7, No. 7, Remote Sensing.

Krodel et al., Extreme stable and complex structures for optomechanical applications, Material Technologies and Applications to Optics, Structures, Components, and Sub-Systems II, Sep. 2, 2015, 12 pages, vol. 9574, SPIE Optical Engineering + Applications, San Diego, California.

International Search Report for International Application No. PCT/US2020/024099 dated Jul. 3, 2020, 17 pages.

Applewhite et al., Effects of thermal gradients on the Mars observer camera primary mirror, Design of Optical Instruments, Sep. 16, 1992, 12 pages, vol. 1690, SPIE, Orlando, Florida.

Wulser et al., EUVI: the STERO-SECCHI extreme ultraviolet imager, Telescopes and Instrumentation for Solar Astrophysics, Feb. 4, 2004, 12 pages, vol. 5171, SPIE, San Diego, California.

International Search Report for International Application No. PCT/US2020/024101 dated Jul. 2, 2020, 17 pages.

Harris, Space View, https://www.harris.com/solution/spaceview, to the best of applicant's knowledge article was available before the application filing date of May 22, 2019, 4 pages, Harris Corporation, Melbourne, FL.

NASA, Hubble Space Telescope, https://www.nasa.gov/content/goddard/hubble-space-telescope-pointing-control-system, Dec. 20, 2017, 3 pages, National Aeronautics and Space Administration, Washington, DC.

U.S. Appl. No. 16/167,437, filed Oct. 22, 2018, Scott Balaban.

* cited by examiner

SPACE OPTICAL SYSTEM WITH INTEGRATED SENSOR MOUNTS

BACKGROUND

Space-based optical systems, such as imaging systems (e.g., telescopes) or laser systems, require accurate and stable pointing information for geolocation. One type of pointing sensor is an inertial rate sensor (e.g., an inertial reference unit (IRU) or inertial measurement unit (IMU)), which is typically used to provide high-frequency pointing and jitter stabilization information. Another type of pointing sensor is a star tracker sensor, which is typically used in pairs to provide gross pointing and location information and requires an unobstructed view to space. The star tracker sensors and inertial rate sensor must be rigidly coupled to the optical system in order to provide accurate information. For example, to achieve a rigid coupling with the optical system, the inertial rate sensor is typically mounted inside the primary structure, directly to the optical system's metering structure and close to the center of mass of the optical system. To maintain a view to space, the primary structure is typically extended up and out from the metering structure to hold the star tracker sensors. To achieve a stable mounting to the optical system, low coefficient of thermal expansion (CTE) materials are typically used to mount the star tracker sensors and inertial rate sensor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
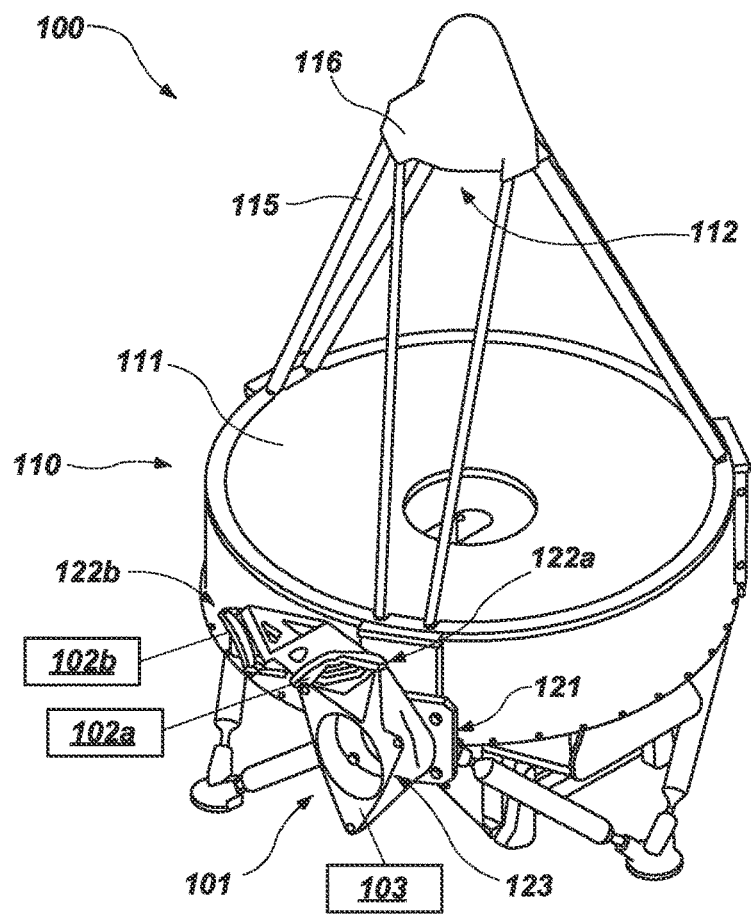
FIG. 1 is an illustration of a space optical system in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although the traditional space-based optical system design configuration having the star tracker sensors and inertial rate sensor mounted directly to the system's primary support structure with the inertial rate sensor being located inside the primary support structure has been effectively employed for many years, this design configuration is not without its drawbacks. While providing a good structural connection to the optical system, directly mounting the inertial rate sensor to the metering structure close to the center of mass of the optical system introduces integration and test, thermal, and packaging challenges that can significantly impact the cost and schedule of a program. Furthermore, to manage the critical interfaces between the optical system and star tracker sensors and inertial rate sensor, the requirements and configuration of these items are typically completed in a serial fashion, as opposed to being designed in parallel, which results in a lengthy design process. In addition, the star tracker sensors and inertial rate sensor generate heat that must be accommodated in the design of the optical system, which complicates the design of the optical system.

Accordingly, a space optical system is disclosed that provides an integrated mount for the star tracker sensors and inertial rate sensor that is attached directly to the metering structure. This isolates star tracker sensors and inertial rate sensor from a systems integration perspective, which enables these items and the optical system to be designed in parallel, reducing the complexity and time required to design the space optical system. The space optical system can include a primary support structure in support of a primary mirror. The space optical system can also include a sensor mounting structure coupled to the primary support structure and extending to an exterior of the optical system. The space optical system can further include first and second sensors (e.g., a star tracker sensor and an inertial rate sensor) mounted on the sensor mounting structure.

An optical system pointing sensor mounting structure can include a main body portion made of a thermally and mechanically stable, non-zero CTE material. The optical system pointing sensor mounting structure can also include a first mounting interface to facilitate coupling with an exterior of a primary support structure of a primary mirror. The optical system pointing sensor mounting structure can further include a second mounting interface to facilitate coupling with a first sensor (e.g., a star tracker sensor). Additionally, the optical system pointing sensor mounting structure can include a third mounting interface to facilitate coupling with a second sensor (e.g., an inertial rate sensor).

Figure 2:
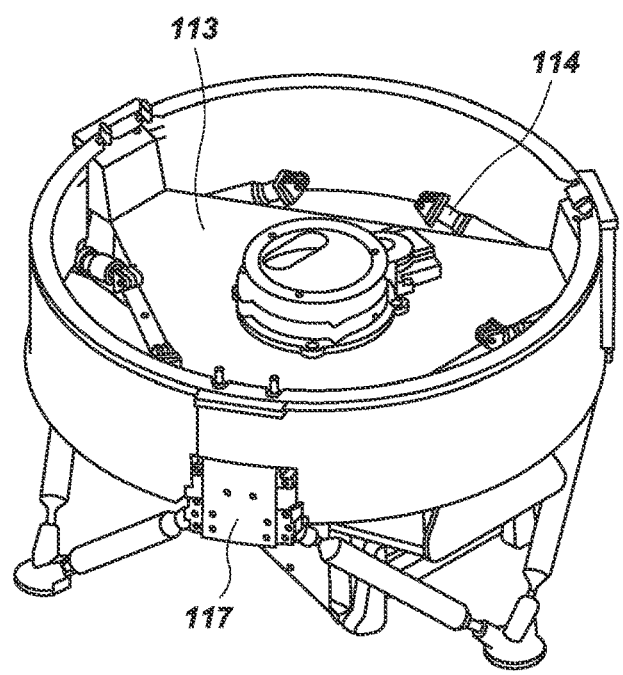
FIG. 2 illustrates a portion of the space optical system of FIG. 1 showing features and components hidden from view in FIG. 1.

To further describe the present technology, examples are now provided with reference to the figures. With reference to FIG. 1, one embodiment of a space optical system 100 is illustrated. A portion of the space optical system 100 is shown in FIG. 2 with certain components omitted to reveal features and components hidden from view in FIG. 1. With reference to FIGS. 1 and 2, the space optical system 100 can comprise a primary support structure 110 in support of a primary mirror 111 and a secondary mirror (hidden from view but located at 112). In some embodiments, the primary mirror 111 and the secondary mirror 112 form a Cassegrain reflector, which may be used in optical telescopes (e.g., high resolution imaging systems), lasers, and radio antennas. The primary support structure 110 can comprise a metering structure, which can include a base 113 (see FIG. 2) (e.g., including a bench that forms the structural base of the mirror system 100) coupled to the primary mirror 111 by one or more primary mirror struts 114. The primary support structure 110 can also include one or more secondary mirror struts 115 extending from the base 113 and coupled to the secondary mirror 112 to support the secondary mirror 112 a distance from the primary mirror 111. For example, the secondary mirror struts 115 can support a secondary mirror mount 116, which can be coupled to the secondary mirror 112.

Figure 3A:
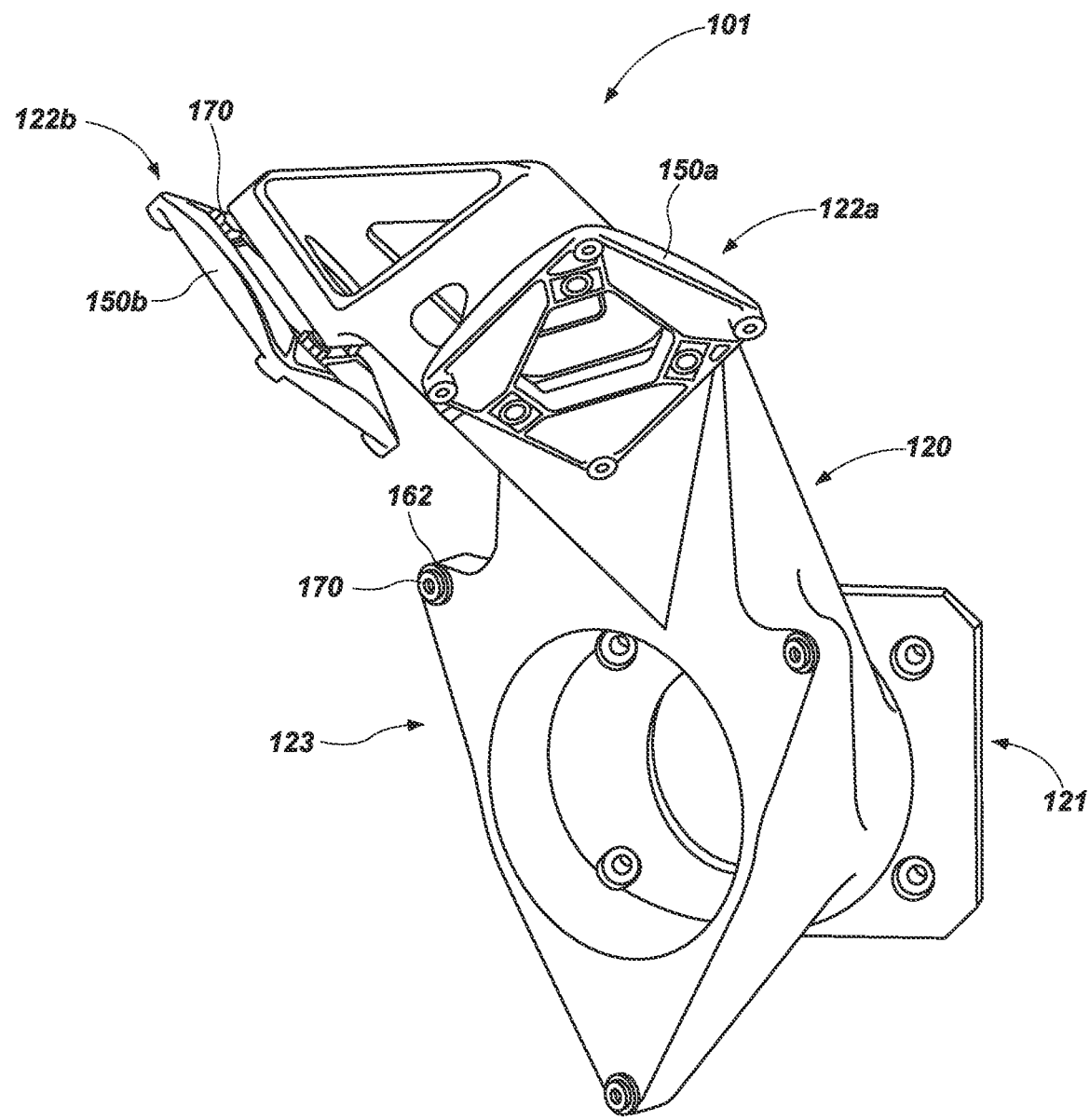
FIG. 3A is a front view of the sensor mounting structure of FIG. 2.
Figure 3B:
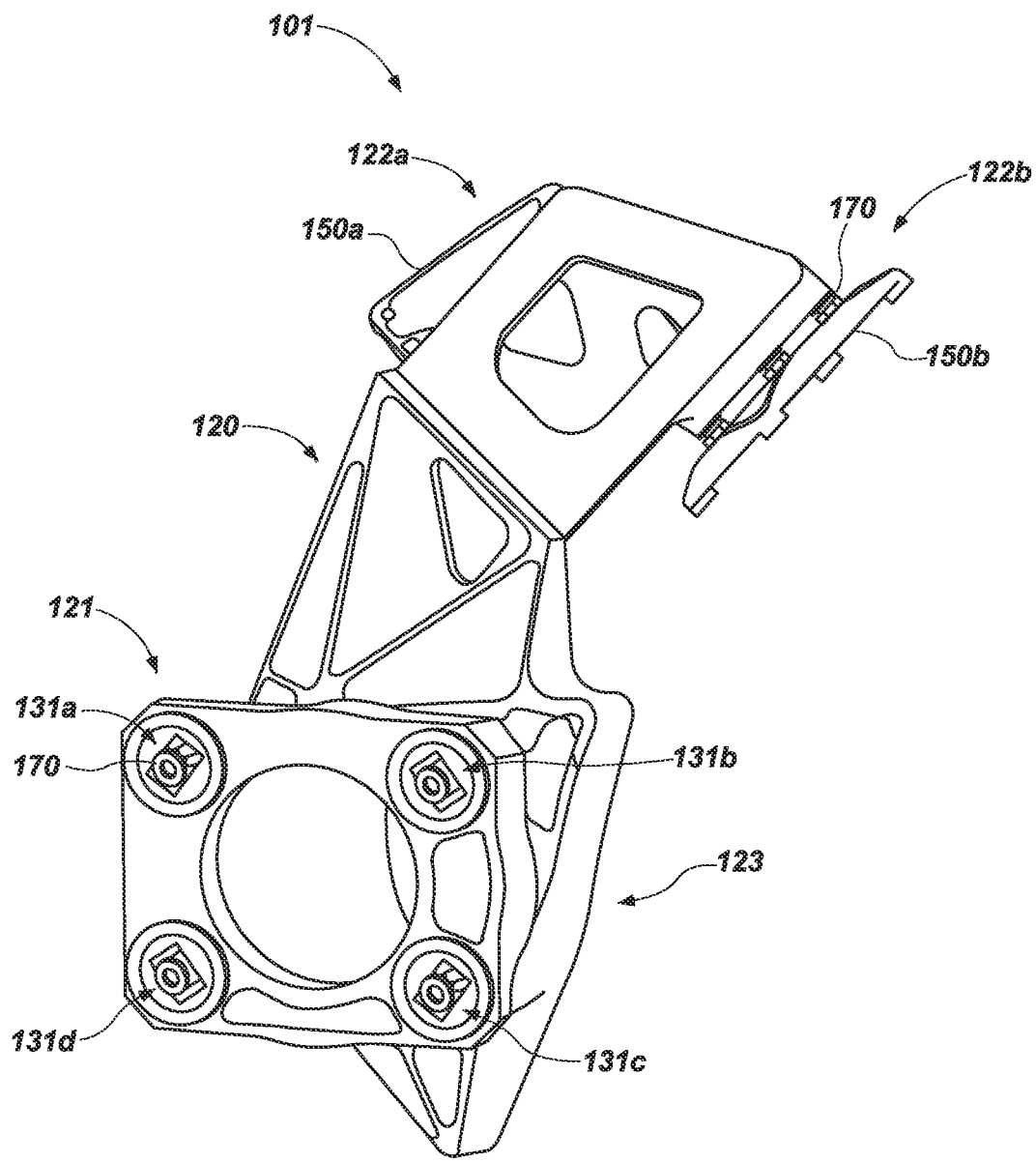
FIG. 3B is a rear view of the sensor mounting structure of FIG. 2.

The space optical system 100 can further comprise a sensor (e.g., pointing sensor) mounting structure 101. Front and rear views of the sensor mounting structure 101 isolated from the rest of the system 100 are shown in FIGS. 3A and 3B, respectively. With reference to FIGS. 1-3B, the sensor mounting structure 101 can be coupled to the primary support structure 110 (e.g., at a mounting pad 117 of the base 113 in FIG. 2). The sensor mounting structure 101 can extend to an exterior of the optical system to facilitate coupling with sensors 102a, 102b, 103, such as pointing sensors. In one aspect, the sensor mounting structure 101 can be attached to and extend from an exterior of the primary support structure 110. In one embodiment, the sensors 102a, 102b are star tracker sensors and the sensor 103 is an inertial rate sensor. Although the sensors 102a, 102b, 103 can be any suitable type of sensor utilized in an optical system (e.g., to facilitate pointing the optical system), for convenience in discussing one exemplary embodiment of an optical system, the sensors 102a, 102b are referred to as star tracker sensors and the sensor 103 is referred to as an inertial rate sensor. A star tracker sensor may typically be an optical device that measures the positions of stars using photocells or a camera. The star tracker sensors 102a, 102b can be of any type or construction known in the art. The inertial rate sensor 103 can likewise be of any type or construction known in the art, such as an inertial reference unit (IRU) and/or an inertial measurement unit (IMU).

In some embodiments, the sensor mounting structure 101 can be coupled to a portion of the base 113 (e.g., at the mounting pad 117). The sensor mounting structure 101 can comprise a main body portion 120, a first mounting interface 121 to facilitate coupling with the exterior of the primary support structure 110, a second mounting interface 122a, 122b to facilitate coupling with the star tracker sensors 102a, 102b, and a third mounting interface 123 to facilitate coupling with the inertial rate sensor 103. The sensor mounting structure 101 can therefore provide an integrated mount for the star tracker sensors 102a, 102b and the inertial rate sensor 103 that is attached directly to the primary support structure 110 (e.g., the base 113 or the telescope metering structure), which maintains the pointing accuracy of the sensing equipment to the telescope's line of sight. In one aspect, the star tracker sensors 102a, 102b and the inertial rate sensor 103 can be mounted or collocated on the sensor mounting structure 101 outside or on an exterior of the primary support structure 110 (e.g., the base 113) that supports the primary mirror 111. In other words, the star tracker sensors 102a, 102b and the inertial rate sensor 103 can be collocated on the same secondary mounting structure (i.e., the sensor mounting structure 101) outside or away from an instrument volume that may be defined by an interior of the primary support structure 110 (e.g., the base 113) that supports the primary mirror 111.

In one aspect, the sensor mounting structure 101 (e.g., the main body portion 120) can be made of a mechanically stable, thermally stable, non-zero CTE material. As used herein, the term "mechanical stability" refers to a material's specific stiffness, for example in units of MPa-m³/kg. A mechanically stable material has a specific stiffness of greater than or equal to 60 MPa-m³/kg. As used herein, the term "thermal stability" refers to how much a material's volumetric shape distorts as energy is put into the material. This can be expressed as the cube of a material's CTE divided by the material's thermal conductivity, for example in units of μm³/W. A thermally stable material has a thermal stability of less than or equal to 7 μm³/W. As used herein, the term "near-zero CTE" includes any CTE greater than or equal to $-4.1 \times 10^{-7}$ K$^{-1}$ and less than or equal to $4.1 \times 10^{-7}$ K$^{-1}$. The term "non-zero CTE" includes any CTE outside of this range.

It should be noted that a thermally stable material does not necessarily have a near-zero CTE. Some thermally stable materials have a relatively high non-zero CTE. For example, a thermally stable material can have a high thermal conductivity, which means that energy put into the material at one location will transfer rapidly through the material so that the material maintains something close to an isothermal condition where every part of the material is at the same temperature. In the case of the sensor mounting structure 101, uniform expansion/contraction of the material as temperature changes maintains form relationships of the part (i.e., the part becomes larger/smaller not tilted or misshapen), which maintains the precise orientations of the star tracker sensors 102a, 102b and the inertial rate sensor 103 even as the sensor mounting structure 101 heats and cools. In contrast, a near-zero CTE material, such as a composite material (e.g., a carbon composite such as carbon fiber, carbon nanotubes, etc.), can get hot in one location but stay cold in another location due to its low thermal conductivity. In this case, instrument or sensor orientations are maintained because there is no thermal deflection regardless of the difference in temperature across the part. Using a mechanically and thermally stable material with a non-zero CTE instead of a near-zero CTE material for the sensor mounting structure 101 can achieve the structural objectives of the instrument or sensor mounts without the expense, complexity, weight, etc. typically associated with designs utilizing near-zero CTE materials. As discussed in more detail below, the non-zero CTE of the sensor mounting structure 101 material can be accommodated by using the same material or different materials with similar CTE at interfaces or by using flexures where the CTEs at interfaces are different.

The sensor mounting structure 101 can include any suitable mechanically and thermally stable material with a non-zero CTE, such as silicon carbide (SiC) (e.g., reaction bonded (RB) or sintered), aluminum silicon carbide metal matrix composite (Al—SiC), aluminum-beryllium metal matrix composite (e.g., AlBeMet), beryllium (e.g., S-200F beryllium), nickel-iron alloy (e.g., 64FeNi, such as INVAR®), aluminum, titanium, etc., in any combination. It should be recognized that the degree of thermal stability required for a given application may vary. For example, aluminum has relatively poor thermal stability compared to SiC or beryllium but may nevertheless be adequate for a particular application.

In one embodiment, the sensor mounting structure 101 can be constructed of multiple SiC elements that are joined in the green state prior to silicon infiltration and reaction bonding. This enables easy machining of the sensor mounting structure 101 and its components when in the green state and formation of hardened, uniform SiC once infiltrated with silicon and reaction bonded. For example, once material has been removed from the green sensor mounting structure, the green sensor mounting structure can be infiltrated with silicon to create an RB SiC sensor mounting structure from the green sensor mounting structure. Reaction bonded silicon carbide is made by a chemical reaction between carbon or graphite with gaseous and/or molten silicon. Silicon infiltration to form reaction bonded SiC can be accomplished by any suitable technique or process known in the art, such as infiltration with silicon in a gaseous and/or molten state. The silicon reacts with the carbon to form silicon carbide (additional SiC if some was present in the preform). The reaction product bonds the silicon carbide particles. Any excess silicon fills the remaining pores in the body and produces a dense SiC—Si composite. Precision features, such as mounting or interface surfaces, can be machined once the material is in the hardened, reaction-bonded SiC state. Because RB SiC is a hard material that is difficult and time-consuming to machine, machining of the hardened SiC can be limited to only high-precision features (e.g., mounting or interface surfaces) that may not be accurately formed following green state machining and subsequent deformation (e.g., shrinkage, although minimal) due to reaction bonding of the silicon carbide. The amount of material removed during such fine machining of the hard SiC material can be minimized by the design of the green sensor mounting structure and/or the location or amount of material removed from the green sensor mounting structure prior to forming RB SiC.

In general, thermoelastic expansion/contraction can be accommodated between the sensor mounting structure 101 and the primary support structure 110, the star tracker sensor 102a, 102b, and the inertial rate sensor 103 by utilizing materials with substantially the same CTE and/or utilizing flexures. For example, as shown in FIGS. 3A and 3B, to accommodate differential thermal expansion and contraction, one or more flexures can be included at the first, second, and/or third mounting interfaces 121, 122a-b, 123. A flexure, as typically known in the mechanical arts, is a flexible element or combination of elements configured to be compliant (e.g., bending and/or torsion) in one or more specific degrees of freedom. The flexures disclosed herein can be of any suitable type or construction, such as a pin flexure, a blade flexure, a notch flexure, a beam flexure, a diaphragm flexure, or others.

Figure 4:
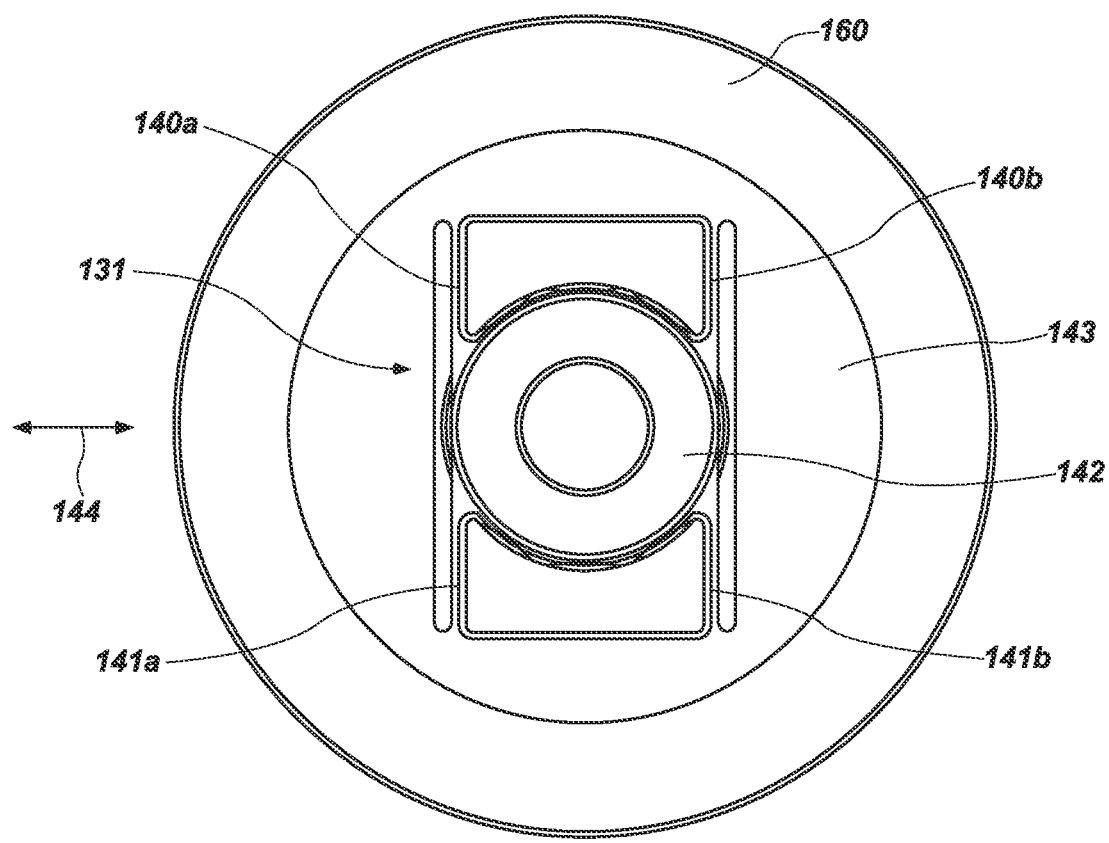
FIG. 4 is an illustration of a flexure of the space optical system of FIG. 1, in accordance with an example of the present disclosure.

In the illustrated embodiment, flexures 131a-d (FIG. 3B) can be included at the first mounting interface 121 and operable to accommodate differential thermal expansion and contraction at the mounting interface 121 with the primary support structure 110 (e.g., the base 113). A detail view of a representative flexure 131 is shown in FIG. 4. In this embodiment, the flexure 131 is configured as a blade flexure. In particular, the flexure 131 comprises pairs of flexure blades 140a-b, 141a-b that connect an inner coupling portion 142 to an outer coupling portion 143. The inner coupling portion 142 is configured to facilitate coupling with the primary support structure 110 (e.g., the base 113), while the outer coupling portion 143 is configured to facilitate coupling with the sensor mounting structure 101 (e.g., the main body portion 120), for example by including threaded coupling or interface features. The flexure blades 140a-b, 141a-b are in a parallel configuration and operable to be compliant and allow flexibility in direction 144. It should be recognized that the illustrated embodiment is not intended to be limiting in any way and that any of the flexures 131a-d can comprise any suitable type of flexure in any configuration in accordance with the principles disclosed herein.

In one aspect, shown in FIG. 3B, the flexures 131a-d can be configured such that compliance is only provided for thermal expansion/contraction while providing stiffness under mechanical loads (e.g., static and/or dynamic loads, such as vibrations). For example, the flexures 131a-d can be oriented such that they are compliant radially under thermoelastic growth/contraction and such that the set or group of flexures 131a-d provides stiffness under radial or lateral mechanical loads. As illustrated, this can be accomplished by orienting each flexure 131a-d for radial compliance from a given location, such as a center point of a circle defined by the flexures 131a-d. Because each of the flexures 131a-d can be configured to be stiff transverse to its compliant direction (i.e., the radial direction), at least two of the flexures in a group can provide stiffness that resists lateral mechanical displacements. Thus, each set or group of flexures 131a-d can provide radial compliance to accommodate thermoelastic growth or shrinkage while also providing stiffness in other (e.g., lateral) degrees of freedom for mechanical loads.

The flexures 131a-d can be constructed of any suitable material which may or may not have substantially the same or similar CTE as the material of the main body portion 120. If the difference between the CTE of the material of the flexures 131a-d and the CTE of the material of the main body portion 120 is great enough to cause structural concerns, then the flexures 131a-d can be coupled to the main body portion 120 via an intermediate structural insert or fitting 160 (FIG. 4) that provides a structural buffer between the dissimilar CTE materials of the flexures 131a-d and the main body portion 120. For example, the material of the fitting 160 can have a CTE that is substantially the same or similar to the CTE of the material of the main body portion 120 to prevent breakage of the main body portion 120, which may be made of a brittle material (e.g., SiG). In this case, the fitting 160 and the flexure 131 in FIG. 4 would comprise materials having different CTEs. The fitting 160 can effectively isolate the main body portion 120 from the thermal expansion/contraction effects of the flexure 131 (e.g., the outer coupling portion 143). In some embodiments, the fitting 160 can be bonded to the main body portion 120. In this case, the CTE of the fitting 160 material and the CTE of the main body portion 120 material can differ from one another and be considered substantially the same or similar so long as the thermally induced stress at the bond over the design temperature range does not cause failure of the bonded joint. In some embodiments, the fitting 160 and the flexure 131 (e.g., the outer coupling portion 143) can have mating threads that provide threaded interface surfaces, so that the flexure 131 is threadedly engaged with the fitting 160. In this case, the materials of the fitting 160 and the flexure 131 can have sufficient strength to withstand the thermally induced stress at the threaded junction without failure. The threaded interface between the flexure 131 and the fitting 160 can be locked with a thread locking compound, as desired. The flexure 131, the fitting 160, and the main body portion 120 can be constructed of any suitable material. In one embodiment, the flexure 131 is constructed of titanium, the fitting 160 is constructed of a nickel-iron alloy (e.g., 64FeNi, such as INVAR®), and the main body portion 120 is constructed of SiC. The fitting 160 can have any suitable configuration, such as a cylindrical or cup configuration.

Figure 5:
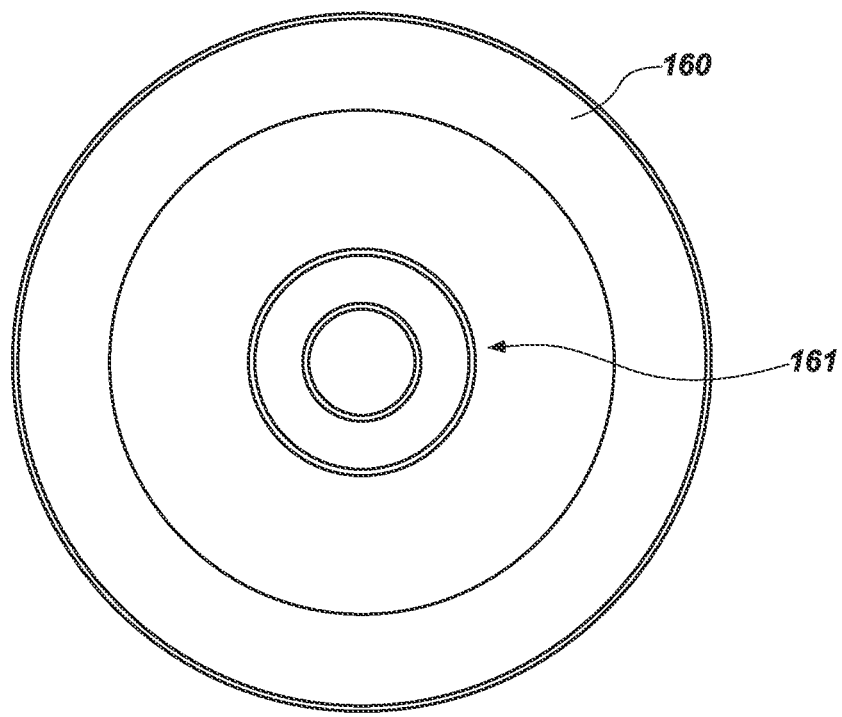
FIG. 5 is an illustration of a mounting post of the space optical system of FIG. 1, in accordance with an example of the present disclosure.

In some embodiments, one or more mounting posts may be included at the mounting interface 121 if rigidity is desired instead of the compliance provided by a flexure. A detail view of a representative mounting post 161 is shown in FIG. 5. The mounting post 161 can be constructed of any suitable material which may or may not have substantially the same or similar CTE as the material of the main body portion 120. As with the flexure 131 of FIG. 4, the mounting post 161 can be coupled to the main body portion 120 via a fitting 160, if desired, for the reasons described above. For example, in one embodiment, the mounting post 161 can be constructed of titanium, the fitting 160 can be constructed of a nickel-iron alloy (e.g., 64FeNi, such as INVAR®), and the main body portion 120 can be constructed of SiC. In some embodiments, the mounting post 161 and the fitting 160 can be coupled by a threaded interface, and the fitting 160 can be bonded to the main body portion 120.

Figure 6A:
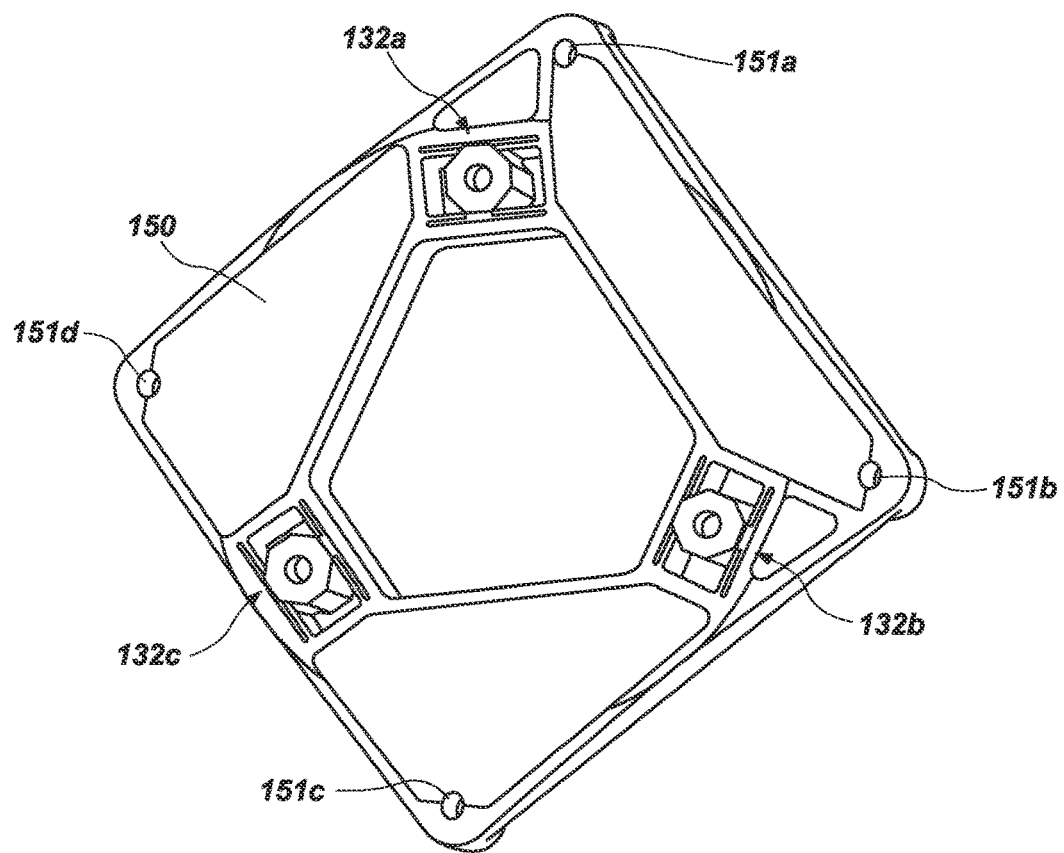
FIG. 6A is a rear view of a mounting bracket and flexures of the sensor mounting structure of FIG. 2.
Figure 6B:
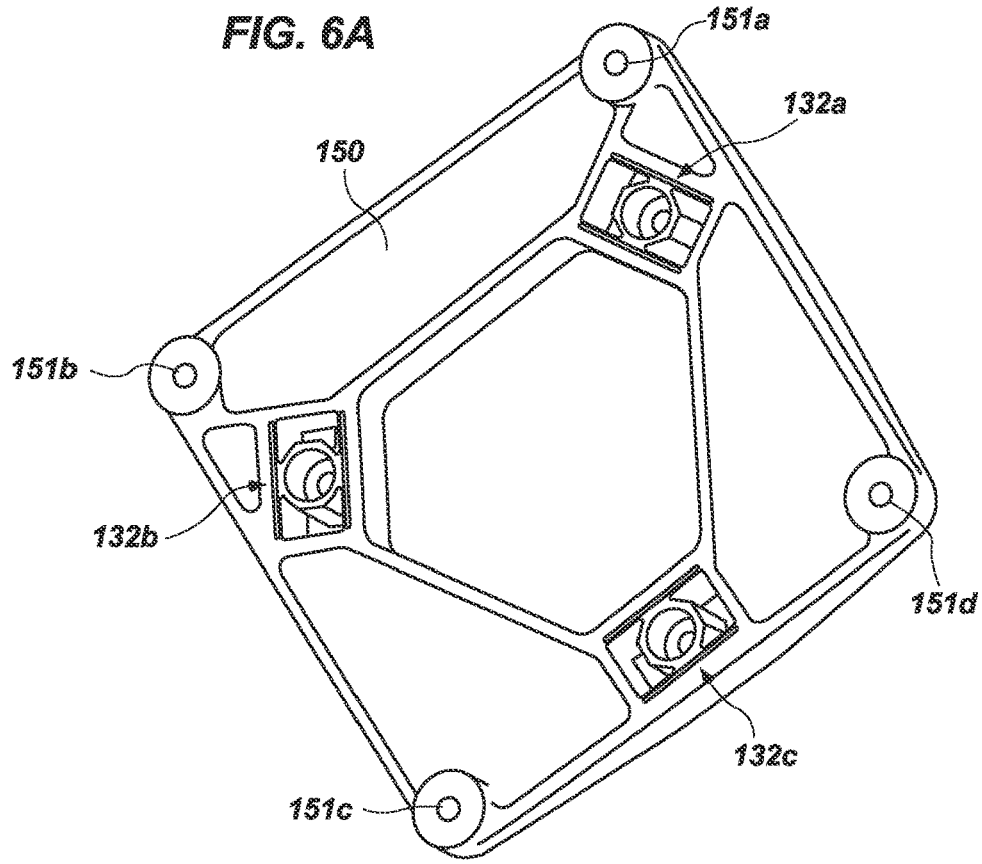
FIG. 6B is a front view of a mounting bracket and flexures of the sensor mounting structure of FIG. 2.

As further shown in the embodiment illustrated in FIGS. 3A and 3B, flexures can be included at the second mounting interface 122a, 122b and operable to accommodate differential thermal expansion and contraction at the mounting interface 122a, 122b with the respective star tracker sensors 102a, 102b. Detailed views of representative flexures 132a-c that can be included at the second mounting interface 122a, 122b are shown in FIGS. 6A and 6B. In this embodiment, each of the flexures 132a-c is configured as a blade flexure similar to that shown in FIG. 4. It should be recognized that the illustrated embodiment is not intended to be limiting in any way and that any of the flexures 132a-c can comprise any suitable type of flexure in any configuration in accordance with the principles disclosed herein.

As with the flexures 131a-d discussed above, the flexures 132a-c can be configured such that compliance is only provided for thermal expansion/contraction while providing stiffness under mechanical loads (e.g., static and/or dynamic loads, such as vibrations). For example, the flexures 132a-c can be oriented such that they are compliant radially under thermoelastic growth/contraction and such that the set or group of flexures 132a-c provides stiffness under radial or lateral mechanical loads. As illustrated, this can be accomplished by orienting each flexure 132a-c for radial compliance from a given location, such as a center point of a circle defined by the flexures 132a-c.

In one aspect, the flexures 132a-c can be included or integrated into a representative mounting bracket 150, as shown in FIGS. 6A and 6B. Mounting brackets 150a, 150b are shown in FIGS. 3A and 3B at the respective mounting interfaces 122a, 122b, The mounting bracket 150 can have mounting features 151a-d (e.g., threaded holes) configured to facilitate coupling the mounting bracket 150 to a star tracker sensor 102a, 102b. The mounting features 151a-d can include any suitable geometry or construction (e.g., a threaded hole or a threaded stud/post) to facilitate interfacing and coupling with a star tracker sensor 102a, 102b. The mounting bracket 150, including the flexures 132a-c, can comprise the same material or a material with substantially the same CTE as the material of a given star tracker sensor 102a, 102b at the respective second mounting interfaces 122a, 122b. Thus, the mounting bracket 150 can undergo thermoelastic expansion and contraction along with the star tracker sensor 102a, 102b to which it is coupled. Matching the CTEs of the mounting bracket 150 and the star tracker sensors 102a, 102b can avoid the need for another set of flexures for coupling the star tracker sensors 102a, 102b to the mounting bracket 150. The flexures 132a-c can accommodate differential thermal expansion and contraction between the mounting bracket 150 (and the star tracker sensor 102a, 102b to which it is coupled) and the primary support structure 110 at the second mounting interface 122a, 122b. In this way, the mounting bracket 150 can serve as an adapter to enable the star tracker sensors 102a, 102b to couple to the sensor mounting structure 101. The mounting bracket 150 can be constructed of any suitable material. In one embodiment, the mounting bracket 150 is constructed of aluminum.

As further shown in FIG. 3A, in the illustrated embodiment, the third mounting interface 123 may not include any flexures associated with the sensor mounting structure 101. In this case, the inertial rate sensor 103 may include its own flexures, or the inertial rate sensor 103 may be constructed of a material that has substantially the same or similar CTE as the material of the sensor mounting structure 101 (e.g., the main body portion 120) at the mounting interface 123. In some embodiments, inserts or fittings 162 can be included to facilitate coupling the inertial rate sensor 103 to the main body portion 120. Such fittings or inserts 162 can have a material with a CTE that is substantially the same or similar to the CTE of the material of the main body portion 120 to prevent breakage of the main body portion 120, which may be made of a brittle material (e.g., SiC). In some embodiments, the fitting 162 can be bonded to the main body portion 120. In some embodiments, the fitting 162 can have threads that provide threaded interface surfaces for coupling the inertial rate sensor 103 to the main body portion 120. In one embodiment, the fitting 162 is constructed of a nickel-iron alloy (e.g., 64FeNi or other alloys commonly known as INVAR®), and the main body portion 120 is constructed of SiC. The fitting 162 can have any suitable configuration, such as a cylindrical or cup configuration. Although obscured from view in the embodiment illustrated in FIGS. 3A and 3B, fittings similar to the fittings 162 can be included at the mounting interfaces 122a, 122b to facilitate coupling the mounting bracket 150 to the main body portion 120.

As described above, the mounting interfaces 121, 122a-b, 123 can be configured with various types of coupling features or members or devices, including flexures, mounting brackets that include flexures, or rigid coupling features without flexures. It should be recognized that any type of coupling feature (e.g., flexures, mounting brackets that include flexures, or rigid coupling features without flexures) can be incorporated at any one of the mounting interfaces 121, 122a-b, 123, as desired for a given application. This includes a flexure to accommodate differential thermal expansion/contraction and/or utilizing materials with substantially the same or similar CTEs to accommodate thermal expansion/contraction of the various components at the mounting interfaces 121, 122a-b, 123 of the sensor mounting structure 101.

In one aspect, shown in FIGS. 3A and 3B, a thermal isolator 170 or barrier can be included at the mounting interfaces 121, 122a-b, 123 between the sensor mounting structure 101 (e.g., the main body portion 120) and the primary support structure 110, the star tracker sensor 102a-b, and/or the inertial rate sensor 103 to thermally isolate the sensor mounting structure 101 from the primary support structure 110, the star tracker sensor 102a-b, and/or the inertial rate sensor 103. The star tracker sensors 102a, 102b and/or the inertial rate sensor 103 may generate a lot of heat, which can present problems if thermally coupled to the primary support structure 110 or the primary mirror 111.

Mounting the star tracker sensors 102*a*, 102*b* and the inertial rate sensor 103 outside of the primary support structure 110 and thermally isolating them from other components allows the energy produced by the star tracker sensors 102*a*, 102*b* and the inertial rate sensor 103 to be radiated out to space and not transferred or conducted across the mounting interfaces 121, 122*a-b*, 123 into the primary support structure 110.

In the illustrated embodiment, thermal isolators 170 are shown at the mounting interface 121 on the flexures 131*a-d* (e.g., the inner coupling portion 142), the mounting interface 122*a-b* between the mounting brackets 150*a*, 150*b* and the sensor mounting structure 101 (e.g., the main body portion 120), and the mounting interface 123 on the fittings or inserts 162. It should be recognized that thermal isolators can be included at any mounting interface, as desired, regardless of the type of coupling feature (e.g., flexures, mounting brackets that include flexures, or rigid coupling features without flexures) incorporated at a given mounting interface. The thermal isolators 170 can have any suitable form or configuration (e.g., a washer) and can be constructed of any suitable low thermal conductivity material that is also mechanically stable (e.g., G10 material) to minimize thermal coupling between the sensor mounting structure 101 (e.g., the main body portion 120) and the structures to which it is mechanically coupled.

Thermal isolation of the star tracker sensors 102*a*, 102*b*, the inertial rate sensor 103 and primary support structure 110 separates the thermal requirements of the telescope and sensing subsystems from one another (e.g., the star tracker sensors 102*a*, 102*b* and the inertial rate sensor 103 do not impact telescope and instrument packaging or performance within the primary support structure 110) so that their interfaces can be developed in parallel, which can save time and money in the development of the optical system 100.

In accordance with one embodiment of the present invention, a method for configuring an optical system pointing sensor is disclosed. The method can comprise obtaining a sensor mounting structure having a first mounting interface to facilitate coupling with an exterior of a primary support structure of a primary mirror, a second mounting interface to facilitate coupling with a star tracker sensor, and a third mounting interface to facilitate coupling with an inertial rate sensor. The method can also comprise coupling the first mounting interface of the sensor mounting structure to the exterior of the primary support structure of the primary mirror, such that the sensor mounting structure extends from the exterior of the primary support structure. The method can further comprise coupling the star tracker sensor to the second mounting interface of the sensor mounting structure. Additionally, the method can comprise coupling the inertial rate sensor to the third mounting interface of the sensor mounting structure. In one embodiment, the sensor mounting structure can comprise a main body portion made of a thermally and mechanically stable, non-zero CTE material. It is noted that no specific order is required in this method, though generally in one embodiment, these method steps can be carried out sequentially.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system, comprising:
    a primary support structure comprising:
        a base in support of a primary mirror; and
        one or more secondary mirror struts extending from the base and coupled to a secondary mirror, wherein the primary and secondary mirror form part of one of a radio or an optical system;
    a sensor mounting structure coupled to the primary support structure and extending from an exterior of the primary support structure; and
    first and second sensors, configured for at least one of pointing or geolocation, independent of the radio or the optical system, the first and second sensors being mounted on the sensor mounting structure at a position away from the exterior of the primary support structure.

2. The system of claim 1, wherein the sensor mounting structure comprises a thermally and mechanically stable, non-zero CTE material.

3. The system of claim 2, wherein the thermally and mechanically stable, non-zero CTE material comprises beryllium, aluminum-beryllium metal matrix composite, SiC, Al-SiC, nickel-iron alloy, or a combination thereof.

4. The system of claim 1, further comprising a flexure operable to accommodate differential thermal expansion and contraction at a mounting interface of the sensor mounting structure with one or more of the primary support structure, the first sensor, or the second sensor.

5. The system of claim 4, further comprising a mounting bracket that integrates the flexure, wherein the mounting bracket comprises
    a same material as a material of the one or more of the primary support structure, the first sensor, or the second sensor at the mounting interface, or
    a material with substantially the same CTE as the material of the one or more of the primary support structure, the first sensor, or the second sensor at the mounting interface.

6. The system of claim 5, further comprising a thermal isolator between the mounting bracket and the sensor mounting structure to thermally isolate the sensor mounting structure from the one or more of the primary support structure, the first sensor, or the second sensor.

7. The system of claim 1, further comprising a thermal isolator between the sensor mounting structure and the one or more of the primary support structure, the first sensor, or the second sensor to thermally isolate the sensor mounting structure from the one or more of the primary support structure, the first sensor, or the second sensor.

8. The system of claim 1, wherein at a mounting interface of the sensor mounting structure with one or more of the primary support structure, the first sensor, or the second sensor, the sensor mounting structure comprises
  a same material as a material of the one or more of the primary support structure, the first sensor, or the second sensor at the mounting interface, or
  a material with substantially the same CTE as the material of the one or more of the primary support structure, the first sensor, or the second sensor at the mounting interface.

9. The system of claim 1, wherein the first sensor comprises a star tracker sensor.

10. The system of claim 1, wherein the second sensor comprises an inertial rate sensor.

11. An pointing sensor mounting structure, comprising:
  a main body portion made of a thermally and mechanically stable, non-zero CTE material;
  a first mounting interface to facilitate coupling with an exterior of a primary support structure, the primary support structure comprising a base in support of a primary mirror and one or more secondary mirror struts extending from the base and coupled to a secondary mirror, wherein the primary and secondary mirror form part of one of a radio or an optical system;
  a second mounting interface to facilitate coupling with a first sensor and positioning of the first sensor away from the exterior of the primary support structure; and
  a third mounting interface to facilitate coupling with a second sensor and positioning of the second sensor away from the exterior of the primary support structure wherein the first and second sensors are configured for at least one of pointing or geolocation independent of the radio or the optical system.

12. The pointing sensor mounting structure of claim 11, wherein the thermally and mechanically stable, non-zero CTE material comprises beryllium, aluminum-beryllium metal matrix composite, SiC, Al-SiC, nickel-iron alloy, or a combination thereof.

13. The pointing sensor mounting structure of claim 11, further comprising a flexure operable to accommodate differential thermal expansion and contraction at one or more of the first, second, or third mounting interfaces.

14. The pointing sensor mounting structure of claim 13, further comprising a mounting bracket that integrates the flexure, wherein the mounting bracket comprises
  a same material as a material of one or more of the primary support structure, the first sensor, or the second sensor at the respective first, second, or third mounting interfaces, or
  a material with substantially the same CTE as the material of the one or more of the primary support structure, the first sensor, or the second sensor at the respective first, second, or third mounting interfaces.

15. The pointing sensor mounting structure of claim 14, further comprising a thermal isolator between the mounting bracket and the one or more of the first, second, or third mounting interfaces to thermally isolate the main body portion from the one or more of the primary support structure, the first sensor, or the second sensor.

16. The pointing sensor mounting structure of claim 13, further comprising a fitting operable to couple the flexure to the main body portion, wherein the fitting and the flexure comprise materials having different CTEs, and a material of the fitting has a CTE that is substantially the same as the material of the main body portion.

17. The pointing sensor mounting structure of claim 16, wherein the fitting is bonded to the main body portion, and the flexure is threadedly engaged with the fitting.

18. The pointing sensor mounting structure of claim 13, wherein the flexure comprises a beam flexure.

19. The pointing sensor mounting structure of claim 11, wherein at one or more of the first, second, or third mounting interfaces, the sensor mounting structure comprises
  a same material as a material of one or more of the primary support structure, the first sensor, or the second sensor at the respective first, second, or third mounting interfaces, or
  a material with substantially the same CTE as the material of the one or more of the primary support structure, the first sensor, or the second sensor at the respective first, second, or third mounting interfaces.

20. A method for configuring pointing sensor for one of a radio or an optical system, comprising:
  obtaining a primary support structure comprising:
    a base in support of a primary mirror; and
    one or more secondary mirror struts extending from the base and coupled to a secondary mirror, wherein the primary and secondary mirror form part of one of a radio or an optical system;
  obtaining a sensor mounting structure having:
    a first mounting interface to facilitate coupling with an exterior of the primary support structure in support of a primary mirror and a secondary mirror,
    a second mounting interface to facilitate coupling with a first sensor, and
    a third mounting interface to facilitate coupling with a second sensor;
  coupling the first mounting interface of the sensor mounting structure to the exterior of the primary support structure of the primary mirror and the secondary mirror, such that the sensor mounting structure extends from the exterior of the primary support structure;
  coupling the first sensor to the second mounting interface of the sensor mounting structure at a position away from the exterior of the primary support structure; and
  coupling the second sensor to the third mounting interface of the sensor mounting structure at a position away from the exterior of the primary support structure;
  wherein the first and second sensors are configured for at least one of pointing or geolocation and are independent of the radio or optical system.

21. The method of claim 20, wherein the sensor mounting structure comprises a main body portion made of a thermally and mechanically stable, non-zero CTE material.

* * * * *